(12) United States Patent
Ghosh et al.

(10) Patent No.: US 10,039,108 B2
(45) Date of Patent: Jul. 31, 2018

(54) TECHNIQUES FOR GROUP-BASED SPATIAL STREAM ASSIGNMENT SIGNALING IN 60 GHZ WIRELESS NETWORKS

(71) Applicant: INTEL IP CORPORATION, Santa Clara, CA (US)

(72) Inventors: Chittabrata Ghosh, Fremont, CA (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/457,653

(22) Filed: Mar. 13, 2017

(65) Prior Publication Data

US 2017/0347349 A1 Nov. 30, 2017

Related U.S. Application Data

(63) Continuation of application No. 14/672,121, filed on Mar. 28, 2015, now Pat. No. 9,596,688.
(Continued)

(51) Int. Cl.
*H04W 72/04* (2009.01)
*H04B 7/0452* (2017.01)
(Continued)

(52) U.S. Cl.
CPC ........ *H04W 72/046* (2013.01); *H04B 7/0452* (2013.01); *H04B 7/0413* (2013.01);
(Continued)

(58) Field of Classification Search
CPC ............. H04W 72/046; H04W 72/005; H04W 72/0413; H04W 72/042; H04W 84/12;
(Continued)

(56) References Cited

U.S. PATENT DOCUMENTS 8,599,804 B2  12/2013 Erceg et al.
8,891,666 B2  11/2014 Lee et al.
(Continued)

OTHER PUBLICATIONS

Office Action received for U.S. Appl. No. 14/672,120, dated Jul. 19, 2017, 16 pages.
(Continued)

*Primary Examiner* — Brian O'Connor

(57) ABSTRACT

Techniques for group-based spatial stream assignment signaling in 60 GHz wireless networks are described. According to various such techniques, a 60 GHz-capable transmitting device may be configured to define one or more DL MU-MIMO groups, each of which may comprise one or more respective 60 GHz-capable receiving devices. In various embodiments, the 60 GHz-capable transmitting device may include a DL MU-MIMO group ID within DL MU-MIMO control information in a PHY header of a PPDU in order to indicate that the PPDU is directed to a DL MU-MIMO group corresponding to that DL MU-MIMO group ID. In some embodiments, DL MU-MIMO control information may comprise information specifying spatial stream assignments for the 60 GHz-capable receiving devices of that DL MU-MIMO group. Other embodiments are described and claimed.

15 Claims, 10 Drawing Sheets

Related U.S. Application Data

(60) Provisional application No. 62/101,923, filed on Jan. 9, 2015.

(51) Int. Cl.
*H04B 7/0413* (2017.01)
*H04W 84/12* (2009.01)
*H04W 72/00* (2009.01)
*H04L 29/06* (2006.01)

(52) U.S. Cl.
CPC ....... *H04L 29/0653* (2013.01); *H04W 72/005* (2013.01); *H04W 72/042* (2013.01); *H04W 72/0406* (2013.01); *H04W 72/048* (2013.01); *H04W 72/0413* (2013.01); *H04W 84/12* (2013.01)

(58) Field of Classification Search
CPC ............ H04W 72/0406; H04W 72/048; H04B 7/0452; H04B 7/0413; H04L 29/0653
See application file for complete search history.

(56) References Cited

U.S. PATENT DOCUMENTS

| | | |
|---|---|---|
| 9,007,967 B2 | 4/2015 | Cordeiro |
| 9,215,571 B2 | 12/2015 | Sohn et al. |
| 9,220,061 B2 | 12/2015 | Kim et al. |
| 9,426,630 B2 | 8/2016 | Seok |
| 9,596,688 B2 * | 3/2017 | Ghosh .................. H04B 7/0452 |
| 9,674,890 B2 * | 6/2017 | Song ..................... H04W 84/12 |
| 2015/0282068 A1 | 10/2015 | Rajagopal et al. |
| 2017/0048866 A1 * | 2/2017 | Chu ....................... H04L 5/0037 |
| 2017/0105229 A1 * | 4/2017 | Luo ..................... H04W 72/121 |

OTHER PUBLICATIONS

Notice of Allowance received for U.S. Appl. No. 14/672,120, dated Jan. 17, 2018, 9 pages.

\* cited by examiner

| Element ID 302 | Length 304 | No. of DL MU-MIMO Groups 306 | MIMO Group Info. Subset 308-0 ||| MIMO Group Info. Subset 308-1 ||| ... | MIMO Group Info. Subset 308-N |||
|---|---|---|---|---|---|---|---|---|---|---|---|---|
| | | | DLMU-MIMO Group ID 310-0 | No. of STAs in Group 312-0 | Group AIDs 314-0 | DLMU-MIMO Group ID 310-1 | No. of STAs in Group 312-1 | Group AIDs 314-1 | | DLMU-MIMO Group ID 310-N | No. of STAs in Group 312-N | Group AIDs 314-N |
| Bits: 8 | 8 | 6 | 6 | 3 | | 6 | 3 | | | 6 | 3 | |

| HT-DMG PHY Sub-header Present 420 | Bandwidth 422 | MIMO Mode 424 | DL MU-MIMO Group ID 416 | NSS 418-0 | NSS 418-1 | ... | NSS 418-P | MIMO Training Fields Present 426 |
|---|---|---|---|---|---|---|---|---|
| 1 | 4 | 1 | 6 | 3 | 3 | | 3 | 1 |

Bits:

| HT-DMG PHY Sub-header Present 420 | Bandwidth 422 | MIMO Mode 424 | DL MU-MIMO Group ID 416 | Spatial Stream Bitmap 528-0 | Spatial Stream Bitmap 528-1 | ••• | Spatial Stream Bitmap 528-P | MIMO Training Fields Present 426 |
|---|---|---|---|---|---|---|---|---|
| 1 | 4 | 1 | 6 | 8 | 8 | | 8 | 1 |

Bits:

*FIG. 8*

_Storage Medium 800_

*Computer Executable Instructions for 600*

*Computer Executable Instructions for 700*

TECHNIQUES FOR GROUP-BASED SPATIAL STREAM ASSIGNMENT SIGNALING IN 60 GHZ WIRELESS NETWORKS

CROSS-REFERENCE TO RELATED APPLICATIONS

This application is a continuation of, claims the benefit of, and claims priority to U.S. patent application Ser. No. 14/672,121 entitled "TECHNIQUES FOR GROUP-BASED SPATIAL STREAM ASSIGNMENT SIGNALING IN 60 GHZ WIRELESS NETWORKS" filed Mar. 28, 2015, which claims the benefit of and priority to previously filed U.S. Provisional Patent Application No. 62/101,923, filed Jan. 9, 2015, the subject matter of which are hereby incorporated by reference in their entireties.

TECHNICAL FIELD

Embodiments described herein generally relate to wireless communications between devices in wireless networks.

BACKGROUND

The 60 GHz wireless communication frequency band offers substantial promise for use in accommodating the ever-growing data-rate demands of wireless communications devices and their users. The 60 GHz band contains a large amount of available bandwidth, and the physical properties of signals with frequencies in the 60 GHz band may support the application of robust beamforming and/or spatial multiplexing techniques and enable significant data rate improvements relative to the data rates achieved via lower frequency bands. In order to leverage such beneficial characteristics in a wireless network that uses the 60 GHz band, it may be desirable to configure wireless devices with downlink (DL) multi-user multiple-input multiple-output (MU-MIMO) capabilities. Configuring a wireless device with DL MU-MIMO capabilities may generally enable that device to make more efficient use of wireless channel resources by simultaneously/concurrently transmitting data to multiple other devices. However, according to conventional techniques for 60 GHz band communications, the use of DL MU-MIMO is not possible. For example, the Institute of Electrical and Electronics Engineers (IEEE) 802.11ad-2012 standard defines a physical layer (PHY) header that is neither capable of addressing a physical layer convergence procedure (PLCP) protocol data unit (PPDU) to multiple stations (STAs) nor capable of specifying assignments of different spatial streams to different such STAs.

BRIEF DESCRIPTION OF THE DRAWINGS

FIG. 3 illustrates an embodiment of an information element.

FIG. 4 illustrates an embodiment of a first header structure.

FIG. 5 illustrates an embodiment of a second header structure.

FIG. 8 illustrates an embodiment of a storage medium.

DETAILED DESCRIPTION

Figure 1:
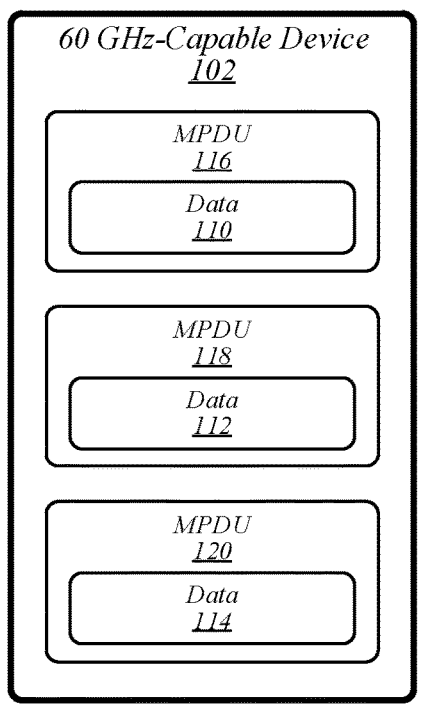
FIG. 1 illustrates an embodiment of a first operating environment.

Disclosed herein are techniques for group-based spatial stream assignment signaling in 60 GHz wireless networks. According to various such techniques, a 60 GHz-capable transmitting device may be configured to define one or more DL MU-MIMO groups, each of which may comprise one or more respective 60 GHz-capable receiving devices. In various embodiments, the 60 GHz-capable transmitting device may include DL MU-MIMO group management information in one or more management frames in order to notify the various 60 GHz-capable receiving devices of the various respective DL MU-MIMO groups to which they belong. In some embodiments, the DL MU-MIMO group management information may specify a defined DL MU-MIMO group identifier (ID) for each DL MU-MIMO group. In various embodiments, the 60 GHz-capable transmitting device may use the defined DL MU-MIMO group IDs to specify DL MU-MIMO groups for which transmitted PPDUs are intended. In some embodiments, the 60 GHz-capable transmitting device may include a given DL MU-MIMO group ID within DL MU-MIMO control information in a PHY header of a PPDU in order to indicate that the PPDU is directed to the DL MU-MIMO group corresponding to that DL MU-MIMO group ID. In various embodiments, DL MU-MIMO control information may comprise information specifying spatial stream assignments for the 60 GHz-capable receiving devices of that DL MU-MIMO group. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards. Some embodiments may involve wireless communications performed according to one or more millimeter-wave (mm-Wave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, a 60 GHz-capable device 102 has respective data to transmit to each of a plurality of 60 GHz-capable devices comprising a 60 GHz-capable device 104, a 60 GHz-capable device 106, and a 60 GHz-capable device 108. More particularly, 60 GHz-capable device 102 has data 110 to transmit to 60 GHz-capable device 104, has data 112 to transmit to 60 GHz-capable device 106, and has data 114 to transmit to 60 GHz-capable device 108. In some embodiments, 60 GHz-capable devices 102, 104, 106, and 108 may comprise wireless communication devices in a wireless network that utilizes wireless channel frequencies of the 60 GHz band. In various embodiments, for example, 60 GHz-capable devices 102, 104, 106, and 108 may comprise wireless communication devices in a wireless local area network (WLAN) that utilizes 60 GHz band wireless communication frequencies. In some embodiments, 60 GHz-capable device 102 may comprise a personal basic service set (PBSS) control point/access point (PCP/AP). In various embodiments, 60 GHz-capable devices 104, 106, and 108 may comprise 60 GHz-capable stations (STAs). The embodiments are not limited in this context.

In operating environment 100, in order to send data to any particular one of 60 GHz-capable devices 104, 106, and 108, 60 GHz-capable device 102 encapsulates that data within one or more medium access control (MAC) protocol data units (MPDUs). In the example of FIG. 1, 60 GHz-capable device 102 encapsulates data 110 within an MPDU 116, encapsulates data 112 within an MPDU 118, and encapsulates data 114 within an MPDU 120. In order to send an MPDU to a given one of 60 GHz-capable devices 104, 106, and 108, 60 GHz-capable device 102 needs to encapsulate that MPDU within a PPDU for transmission to that 60 GHz-capable device. 60 GHz-capable device 102 may make more efficient use of wireless channel resources if it can encapsulate MPDUs 116, 118, and 120 in a same PPDU for DL MU-MIMO transmission to 60 GHz-capable devices 104, 106, and 108 using multiple spatial streams, rather than being required to transmit a first PPDU comprising MPDU 116, transmit a second PPDU comprising MPDU 118, and transmit a third PPDU comprising MPDU 120. However, according to conventional techniques, 60 GHz-capable device 102 may have no way of addressing a given PPDU to more than one receiving device or of notifying receiving devices of assigned spatial streams, and thus may not be able to successfully convey data to 60 GHz-capable devices 104, 106, and 108 via DL MU-MIMO data transmissions.

Disclosed herein are techniques for group-based spatial stream assignment signaling in 60 GHz wireless networks. According to various such techniques, a 60 GHz-capable transmitting device such as 60 GHz-capable device 102 may be configured to define one or more DL MU-MIMO groups, each of which may comprise one or more respective 60 GHz-capable receiving devices such as 60 GHz-capable receiving devices 104, 106, and 108. In some embodiments, the 60 GHz-capable transmitting device may include DL MU-MIMO group management information in one or more management frames in order to notify the various 60 GHz-capable receiving devices of the various respective DL MU-MIMO groups to which they belong. In various embodiments, the DL MU-MIMO group management information may specify a defined DL MU-MIMO group identifier (ID) for each DL MU-MIMO group. In some embodiments, the 60 GHz-capable transmitting device may use the defined DL MU-MIMO group IDs to specify DL MU-MIMO groups for which transmitted PPDUs are intended. In various embodiments, the 60 GHz-capable transmitting device may include a given DL MU-MIMO group ID within DL MU-MIMO control information in a PHY header of a PPDU in order to indicate that the PPDU is directed to the DL MU-MIMO group corresponding to that DL MU-MIMO group ID. In some embodiments, DL MU-MIMO control information may comprise information specifying spatial stream assignments for the 60 GHz-capable receiving devices of that DL MU-MIMO group. The embodiments are not limited in this context.

Figure 2:
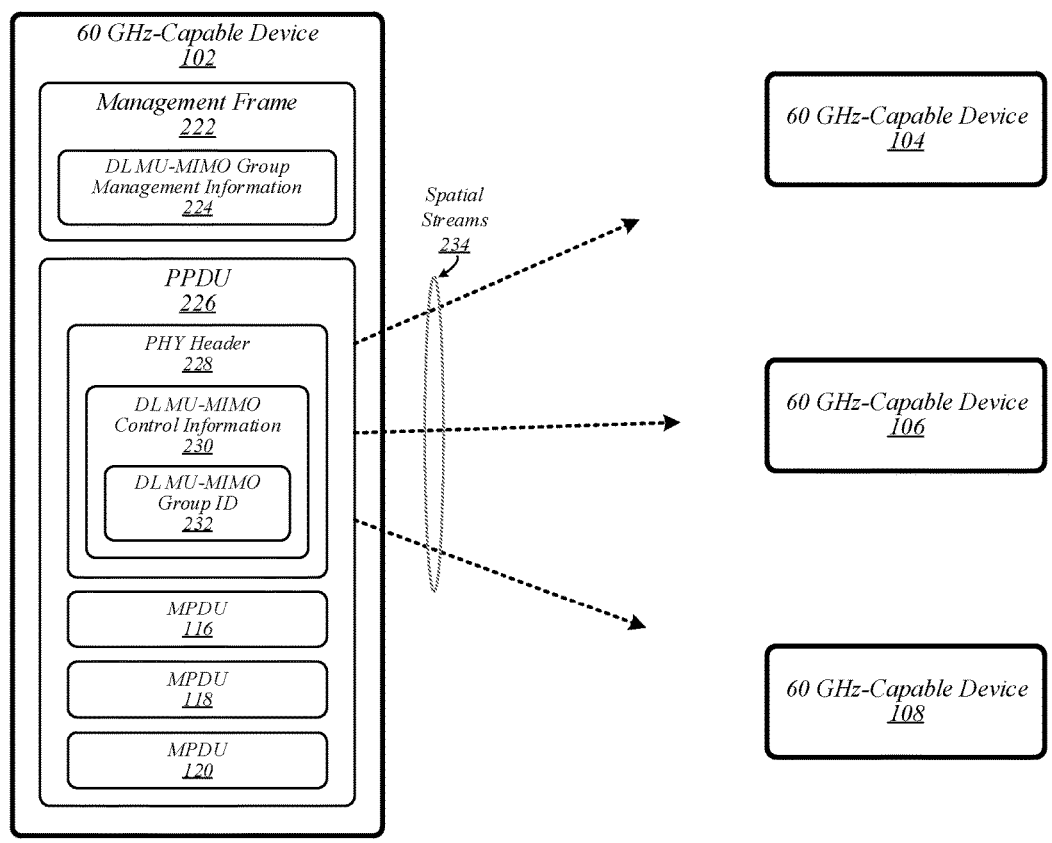
FIG. 2 illustrates an embodiment of a second operating environment.

FIG. 2 illustrates an example of an operating environment 200 such as may be representative of some embodiments that implement one or more of the disclosed techniques for group-based spatial stream assignment signaling in 60 GHz wireless networks. In operating environment 200, 60 GHz-capable device 102 defines one or more DL MU-MIMO groups and then includes DL MU-MIMO group management information 224 in a management frame 222 in order to notify the 60 GHz-capable receiving devices in the DL MU-MIMO groups of the particular DL MU-MIMO groups to which they belong. Examples of management frame 222 in various embodiments may include—without limitation—a beacon frame, a probe response frame, an announcement traffic indication message (ATIM) frame, an association response frame, a reassociation response frame, an authentication frame, and an action frame. In some embodiments, DL MU-MIMO group management information 224 may be comprised in a DL MU-MIMO group management information element (IE) contained in management frame 222. In various embodiments, DL MU-MIMO group management information 224 may specify a respective DL MU-MIMO group ID for each of the one or more defined DL MU-MIMO groups. In some embodiments, DL MU-MIMO group management information 224 may identify the respective 60 GHz-capable receiving device(s) comprised in each such DL MU-MIMO group.

In various embodiments, a given 60 GHz-capable receiving device that receives management frame 222 may access DL MU-MIMO group management information 224 to determine a DL MU-MIMO group ID for a DL MU-MIMO group to which it belongs. In some embodiments, that 60 GHz-capable receiving device may then determine whether it is an addressee of a subsequently-transmitted PPDU 226 based on that DL MU-MIMO group ID. In various embodiments, the PPDU 226 may comprise a PHY header 228 that contains DL MU-MIMO control information 230. In some embodiments, DL MU-MIMO control information 230 may comprise information specifying spatial stream assignments for 60 GHz-capable receiving devices belonging to a DL MU-MIMO group to which PPDU 226 is addressed. In various embodiments, DL MU-MIMO control information 230 may contain a DL MU-MIMO group ID 232 that identifies the DL MU-MIMO group to which PPDU 226 is addressed. In some embodiments, the 60 GHz-capable receiving device may determine that it is an addressee of PPDU 226 if its DL MU-MIMO group ID matches DL MU-MIMO group ID 232. In various embodiments, in response to a determination that it is an addressee of PPDU 226, the 60 GHz-capable receiving device may use DL MU-MIMO control information 230 to identify one or more spatial streams via which it is to receive data from 60 GHz-capable device 102. The embodiments are not limited in this context.

FIG. 3 illustrates an example of an information element (IE) 300 such as may be representative of DL MU-MIMO group management information 224 of FIG. 2 in some embodiments. For the purpose of explanation, example names are depicted for the various fields in IE 300. However, it is to be appreciated that the depicted names are exemplary only, and that the embodiments are not limited to the depicted examples. In various embodiments, IE 300 may comprise an Element ID field 302. In some embodiments, Element ID field 302 may comprise a value indicating that IE 300 comprises a DL MU-MIMO group management IE.

In various embodiments, Element ID field 302 may comprise a length of eight bits. In some embodiments, IE 300 may comprise a Length field 304. In various embodiments, Length field 304 may comprise a value indicating a number of octets contained in IE 300 following Length field 304. In some embodiments, Length field 304 may comprise a length of eight bits. In various embodiments, IE 300 may comprise a No. of DL MU-MIMO Groups field 306. In some embodiments, No. of DL MU-MIMO Groups field 306 may comprise a value indicating a number of different DL MU-MIMO groups that are described in IE 300. In various embodiments, No. of DL MU-MIMO Groups field 306 may comprise a length of six bits, corresponding to a scenario in which IE 300 can describe up to 64 different DL MU-MIMO groups. In some other embodiments, No. of DL MU-MIMO Groups field 306 may comprise a lesser or greater number of bits. The embodiments are not limited in this context.

In various embodiments, IE 300 may comprise one or more MIMO group information subsets 308-$i$. More particularly, for each possible integer value of i from 0 to N, where the value comprised in No. of DL MU-MIMO Groups field 306 is equal to N+1, IE 300 may comprise a respective MIMO group information subset 308-$i$. In some embodiments, each MIMO group information subset 308-$i$ may comprise a respective DL MU-MIMO Group ID field 310-$i$. In various embodiments, each DL MU-MIMO Group ID field 310-$i$ may comprise a DL MU-MIMO group ID for a DL MU-MIMO group that the corresponding MIMO group information subset 308-$i$ describes. In some embodiments, each DL MU-MIMO Group ID field 310-$i$ may comprise a length equal to that of No. of DL MU-MIMO Groups field 306. For example, in various embodiments in which No. of DL MU-MIMO Groups field 306 comprises a length of six bits, each DL MU-MIMO Group ID field 310-$i$ may comprise a length of six bits. The embodiments are not limited to this example.

In some embodiments, each MIMO group information subset 308-$i$ may comprise a respective No. of STAs in Group field 312-$i$. In various embodiments, each No. of STAs in Group field 312-$i$ may contain a value indicating a number of STAs comprised in the DL MU-MIMO group identified by the DL MU-MIMO group ID in the corresponding DL MU-MIMO Group ID field 310-$i$. In some embodiments, the lengths of No. of STAs in Group fields 312-$i$ may be defined based on a maximum number of STAs that may be contained in a given DL MU-MIMO group. In various embodiments, the maximum number of STAs that may be contained in a given DL MU-MIMO group may in turn be defined based on a maximum number MAX_NSS of spatial streams that may be used for DL MU-MIMO transmissions. In some embodiments, MAX_NSS may be equal to 8, a given DL MU-MIMO group may thus be permitted to contain up to eight STAs, and each No. of STAs in Group field 312-$i$ may comprise a length of three bits. The embodiments are not limited to this example.

In various embodiments, each MIMO group information subset 308-$i$ may comprise a respective Group AIDs field 314-$i$. In some embodiments, each Group AIDs field 314-$i$ may comprise a respective AID for each STA in the corresponding DL MU-MIMO group. In various embodiments, the length of each Group AIDs field 314-$i$ may depend on the number of STAs in that DL MU-MIMO group. In some embodiments, each Group AIDs field 314-$i$ may comprise eight bits for each STA in the DL MU-MIMO group to which it corresponds. In various embodiments, rather than being comprised within respective MIMO group information subsets 308-0 to 308-N, Group AIDs fields 314-0 to 314-N may follow MIMO group information subset 308-N, in consecutive order relative to the respective MIMO group information subsets 308-*i* to which they correspond. The embodiments are not limited in this context.

FIG. 4 illustrates an example of a header structure 400 such as may be representative of a header structure that may be used in some embodiments to implement techniques for group-based spatial stream assignment signaling in 60 GHz wireless networks. More particularly, header structure 400 may be representative of a structure of PHY header 228 of FIG. 2 in various embodiments. In some embodiments, after determining its DL MU-MIMO group ID based on a DL MU-MIMO group management IE such as IE 300 of FIG. 3, a 60 GHz-capable STA may use information in header structure 400 to determine whether it is an addressee of a PPDU comprising header structure 400 and, if so, to identify one or more spatial streams via which it is to receive data comprised in the PPDU. In various embodiments, header structure 400 may comprise a DL MU-MIMO Group ID subfield 416. In some embodiments, DL MU-MIMO Group ID subfield 416 may comprise a DL MU-MIMO group ID for a DL MU-MIMO group to which the PPDU is addressed. In various embodiments, DL MU-MIMO Group ID subfield 416 may comprise a length equal to that defined for No. of DL MU-MIMO Groups field 306 of FIG. 3. In some embodiments, DL MU-MIMO Group ID subfield 416 may comprise a length of six bits. The embodiments are not limited in this context.

In various embodiments, header structure 400 may comprise one or more NSS subfields 418-*j*. More particularly, for each possible integer value of j from 0 to P, where the DL MU-MIMO group identified by DL MU-MIMO Group ID subfield 416 comprises P+1 STAs, header structure 400 may comprise a respective NSS subfield 418-*j*. In some embodiments, each NSS subfield 418-*j* may specify a number of spatial streams assigned to a respective STA among those in the DL MU-MIMO group. In various embodiments, the order in which the various NSS subfields 418-*j* appear in header structure 400 may correspond to the order in which the AIDs of their associated STAs appear in a MIMO group information subset 308-*i* for the DL MU-MIMO group within IE 300 of FIG. 3. In some embodiments, NSS subfields 418-*j* may be populated in accordance with a convention that the respective spatial streams assigned to each STA are to be consecutive with respect to a reference order defined for such spatial streams. The embodiments are not limited in this context.

As reflected in FIG. 4, in various embodiments, header structure 400 may comprise one or more other subfields in addition to DL MU-MIMO Group ID subfield 416 and NSS subfields 418-*j*. For example, in some embodiments, header structure 400 may comprise an HT-DMG PHY Sub-header Present subfield 420. In various embodiments, HT-DMG PHY Sub-header Present subfield 420 may comprise a length of one bit. In some embodiments, header structure 400 may comprise a Bandwidth subfield 422. In various embodiments, Bandwidth subfield 422 may comprise a length of four bits. In some embodiments, header structure 400 may comprise a MIMO Mode subfield 424. In various embodiments, MIMO Mode subfield 424 may comprise a length of one bit. In some embodiments, header structure 400 may comprise a MIMO Training Fields Present subfield 426. In various embodiments, MIMO Training Fields Present subfield 426 may comprise a length of one bit. The embodiments are not limited to these examples.

FIG. 5 illustrates an example of a header structure 500 such as may be representative of a header structure that may be used in various embodiments to implement techniques for group-based spatial stream assignment signaling in 60 GHz wireless networks. As shown in FIG. 5, header structure 500 comprises many of the subfields discussed above in reference to header structure 400 of FIG. 4. However, instead of NSS subfields 418-*j*, header structure 500 comprises Spatial Stream Bitmap subfields 528-*j*. In some embodiments, each Spatial Stream Bitmap subfield 528-*j* may comprise a bitmap specifying the particular respective spatial stream(s) assigned to a respective STA among those in the DL MU-MIMO group. In various embodiments, the order in which the various Spatial Stream Bitmap subfields 528-*j* appear in header structure 500 may correspond to the order in which the AIDs of their associated STAs appear in a MIMO group information subset 308-*i* for the DL MU-MIMO group within IE 300 of FIG. 3. In various embodiments, the use of Spatial Stream Bitmap subfields 528-*j* may enable a PCP/AP to assign non-consecutive spatial streams to a same STA, rather than being constrained by a requirement that all of the spatial streams assigned to any given STA must be consecutive. In some embodiments, each Spatial Stream Bitmap subfield 528-*j* may comprise a bit sequence of a length equal to MAX_NSS. In the example of FIG. 5, Spatial Stream Bitmap subfields 528-*j* each comprise lengths of eight bits, reflecting a scenario in which MAX_NSS=8. In various embodiments, each bit in the sequence may correspond to a respective one of MAX_NSS spatial streams that are available to a transmitting PCP/AP. In some embodiments, these correspondences may be defined according to a reference order for such spatial streams. The embodiments are not limited in this context.

Figure 6:
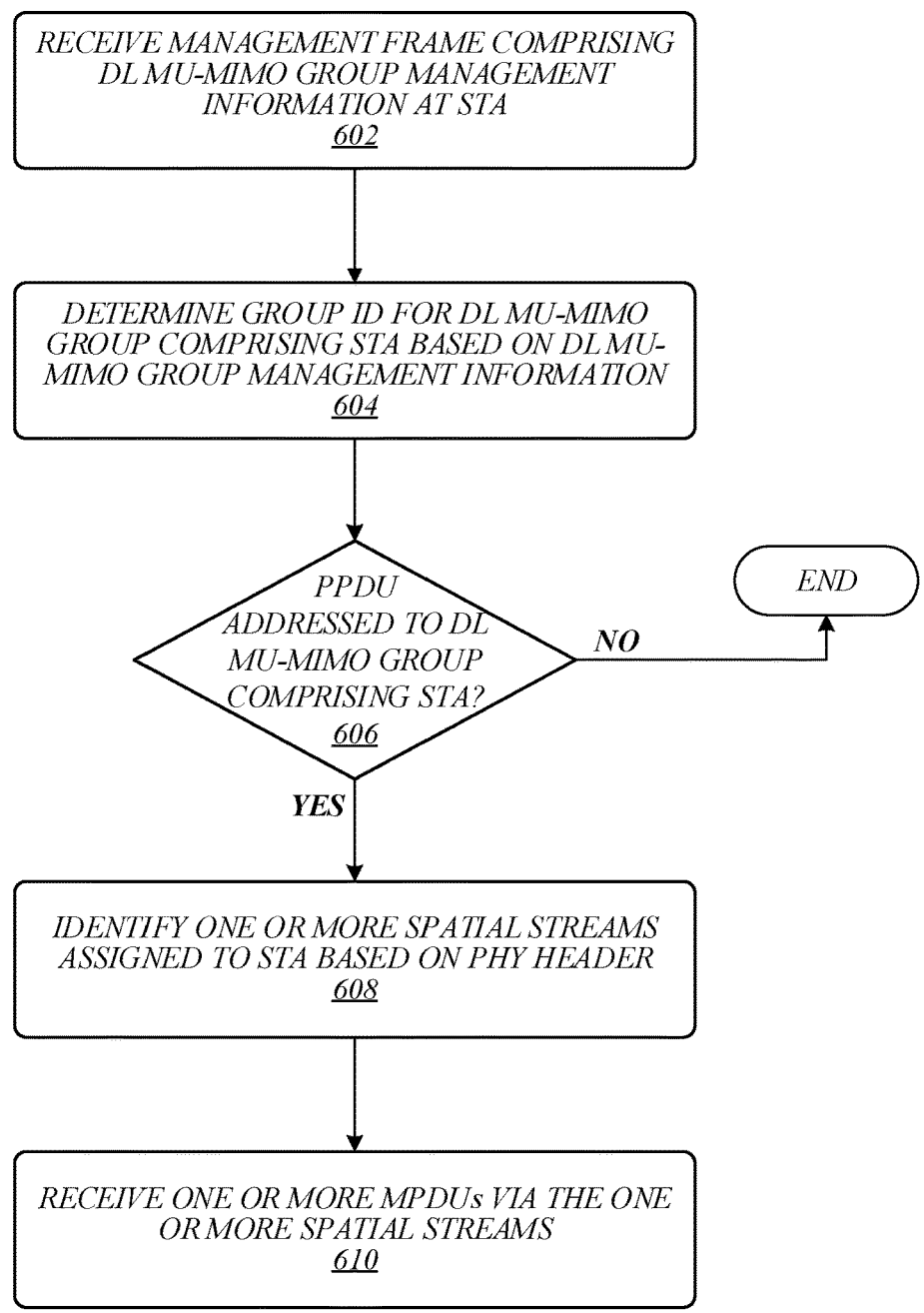
FIG. 6 illustrates an embodiment of a first logic flow.

FIG. 6 illustrates an example of a logic flow 600, which may be representative of operations that may be performed in various embodiments in conjunction with the implementation of the disclosed techniques for group-based spatial stream assignment signaling in 60 GHz wireless networks. For example, logic flow 600 may be representative of operations that may be performed in various embodiments by one or more of 60 GHz-capable devices 104, 106, and 108. In some such embodiments, one or more of 60 GHz-capable devices 104, 106, and 108 may perform the operations of logic flow 600 in conjunction with operating as STAs in a 60-GHz band wireless network. As shown in FIG. 6, a management frame that comprises DL MU-MIMO group management information may be received at a STA at 602. For example, 60 GHz-capable device 104 may receive management frame 222, which may comprise DL MU-MIMO group management information 224. At 604, a group ID for a DL MU-MIMO group comprising the STA may be determined based on the DL MU-MIMO group management information. For example, 60 GHz-capable device 104 may identify a MIMO group information subset 308-*i* that contains an AID associated with 60 GHz-capable device 104 and identify a group ID for a DL MU-MIMO group comprising 60 GHz-capable device 104 as the group ID comprised in a DL MU-MIMO group ID subfield 310-*i* of the MIMO group information subset 308-*i*.

At 606, it may be determined whether a PPDU is addressed to the DL MU-MIMO group comprising the STA. For example, 60 GHz-capable device 104 may determine whether PPDU 226 is addressed to its DL MU-MIMO group based on whether a DL MU-MIMO group ID 232 in PHY header 228 matches the group ID identified at 604. If it is determined at 606 that the PPDU is not addressed to the DL MU-MIMO group comprising the STA, the logic flow may end. If it is determined at 606 that the PPDU is addressed to the DL MU-MIMO group comprising the STA, flow may pass to 608. At 608, one or more spatial streams that are assigned to the STA may be identified based on a PHY header of the PPDU. For example, 60 GHz-capable device 104 may identify one or more spatial streams 234 that are assigned to 60 GHz-capable device 104 based on PHY header 228. At 610, one or more MPDUs may be received via the one or more spatial streams. For example, 60 GHz-capable device 104 may receive one or more of MPDUs 116, 118, and 120 via one or more spatial streams 234 identified at 608. The embodiments are not limited to these examples.

Figure 7:
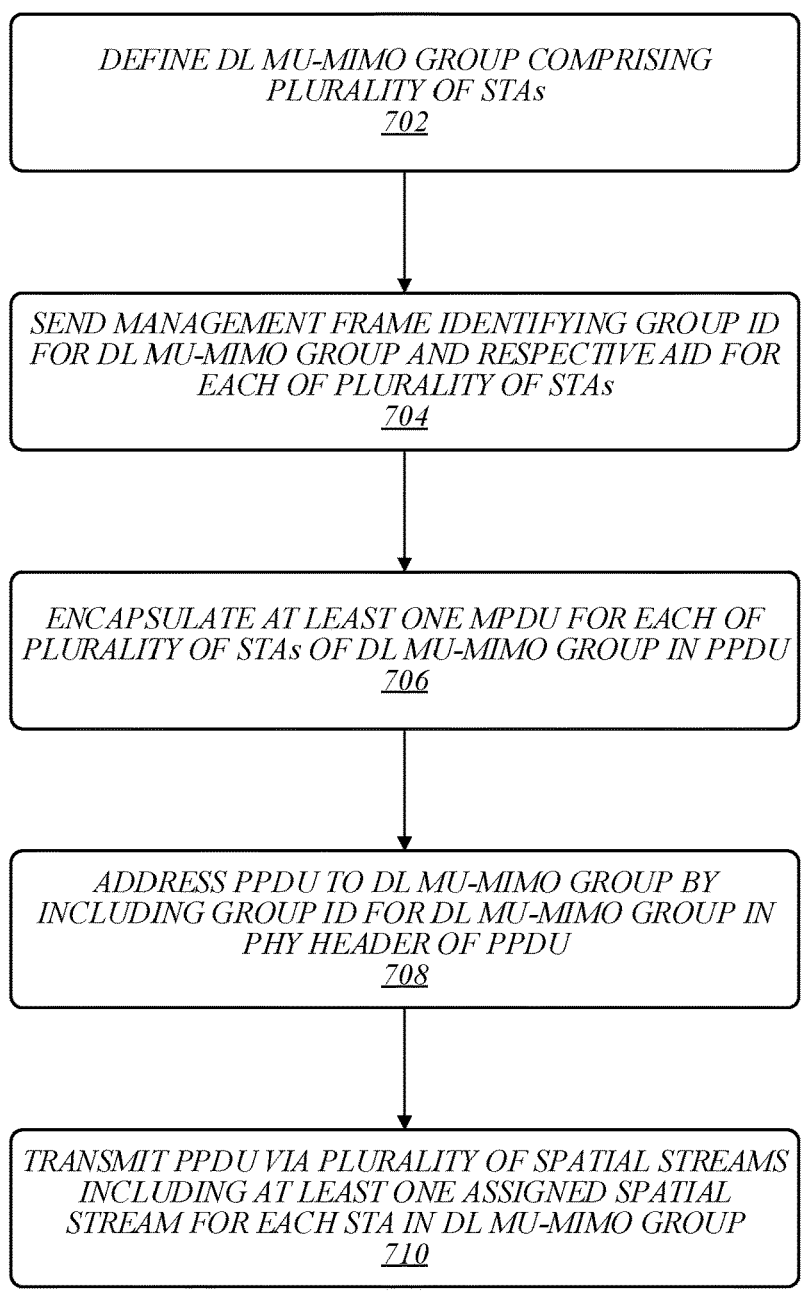
FIG. 7 illustrates an embodiment of a second logic flow.

FIG. 7 illustrates an example of a logic flow 700, which may be representative of operations that may be performed in some embodiments in conjunction with the implementation of the disclosed techniques for group-based spatial stream assignment signaling in 60 GHz wireless networks. For example, logic flow 700 may be representative of operations that may be performed in some embodiments by 60 GHz-capable device 102. In various such embodiments, 60 GHz-capable device 102 may perform the operations of logic flow 700 in conjunction with operating as a PCP/AP for a 60 GHz-band wireless network. As shown in FIG. 7, a DL MU-MIMO group may be defined at 702 and may comprise a plurality of STAs. For example, 60 GHz-capable device 102 define a DL MU-MIMO group that comprises 60 GHz-capable devices 104, 106, and 108. At 704, a management frame may be sent that identifies a group ID for the DL MU-MIMO group and a respective AID for each of the plurality of STAs. For example, 60 GHz-capable device 102 may send a management frame 222 containing an IE 300 that comprises a MIMO group information subset 308-$i$ containing the group ID for the DL MU-MIMO group that comprises 60 GHz-capable devices 104, 106, and 108 and the respective AIDs of 60 GHz-capable devices 104, 106, and 108.

At 706, at least one respective MPDU for each of the plurality of STAs of the DL MU-MIMO group may be encapsulated in a PPDU. For example, 60 GHz-capable device 102 may encapsulate an MPDU 116 for 60 GHz-capable device 104, an MPDU 118 for 60 GHz-capable device 106, and an MPDU 120 for 60 GHz-capable device 108 in PPDU 226. At 708, the PPDU may be addressed to the DL MU-MIMO group by including the group ID for the DL MU-MIMO group in a PHY header of the PPDU. For example, 60 GHz-capable device 102 may address PPDU 226 to a DL MU-MIMO group defined at 702 to comprise 60 GHz-capable devices 104, 106, and 108 by including in PHY header 228 a DL MI-MIMO group ID 232 that matches the group ID for the DL MU-MIMO group. At 710, the PPDU may be transmitted via a plurality of spatial streams that includes at least one assigned spatial stream for each STA in the DL MU-MIMO group. For example, 60 GHz-capable device 102 may transmit PPDU 226 via a plurality of spatial streams 234, and the plurality of spatial streams 234 may include one or more spatial streams 234 assigned to 60 GHz-capable device 104, one or more spatial streams 234 assigned to 60 GHz-capable device 106, and one or more spatial streams 234 assigned to 60 GHz-capable device 108. The embodiments are not limited to these examples.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement logic flow 600 of FIG. 6 and/or logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
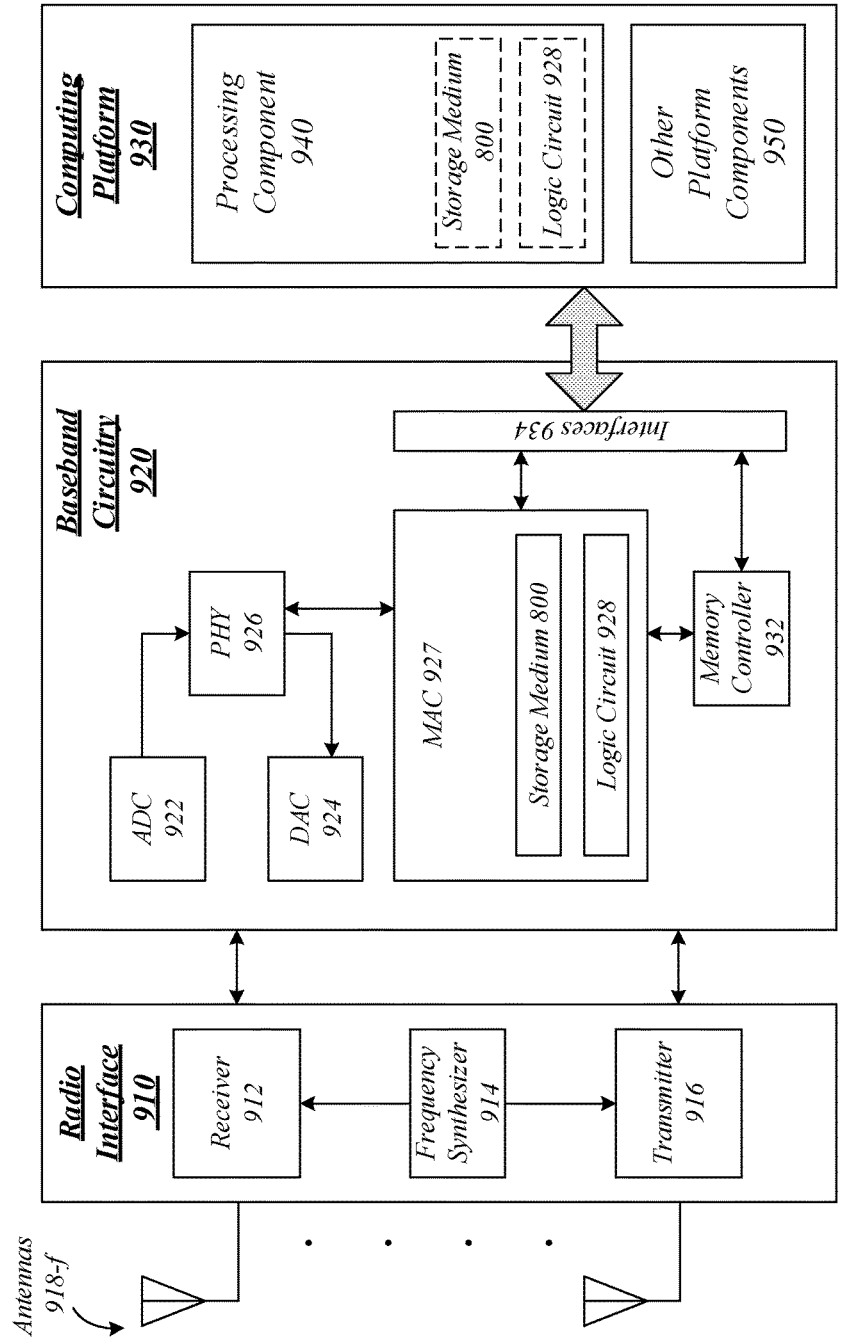
FIG. 9 illustrates an embodiment of a device.

FIG. 9 illustrates an embodiment of a communications device 900 that may implement one or more of 60 GHz-capable devices 102, 104, 106, and 108 of FIG. 1, logic flow 600 of FIG. 6, logic flow 700 of FIG. 7, and storage medium 800 of FIG. 8. In some embodiments, communications device 900 may be representative of a PCP/AP that transmits management frames containing DL MU-MIMO group management IEs that comprise structures corresponding to IE 300 of FIG. 3. In various embodiments, communications device 900 may be representative of a PCP/AP that transmits PPDUs containing PHY headers that comprise a structure corresponding to header structure 400 of FIG. 4 or header structure 500 of FIG. 5. In various embodiments, communication device 900 may be representative of a 60 GHz-capable STA that determines a DL MU-MIMO group to which it belongs based on a DL MU-MIMO group management IE that comprises a structure corresponding to IE 300 of FIG. 3. In some embodiments, communication device 900 may be representative of a 60 GHz-capable STA that receives MPDUs via PPDUs containing PHY headers that comprise a structure corresponding to header structure 400 of FIG. 4 or header structure 500 of FIG. 5. The embodiments are not limited in this context.

In various embodiments, device 900 may comprise a logic circuit 928. The logic circuit 928 may include physical circuits to perform operations described for one or more of 60 GHz-capable devices 102, 104, 106, and 108 of FIG. 1, logic flow 600 of FIG. 6, and logic flow 700 of FIG. 7, for example. As shown in FIG. 9, device 900 may include a radio interface 910, baseband circuitry 920, and computing platform 930, although the embodiments are not limited to this configuration. In some embodiments, device 900 may implement some or all of the structure and/or operations for one or more of 60 GHz-capable devices 102, 104, 106, and 108 of FIG. 1, logic flow 600 of FIG. 6, logic flow 700 of FIG. 7, storage medium 800 of FIG. 8, and logic circuit 928 in a single computing entity, such as entirely within a single device. Alternatively, the device 900 may distribute portions of the structure and/or operations for one or more of 60 GHz-capable devices 102, 104, 106, and 108 of FIG. 1, logic flow 600 of FIG. 6, logic flow 700 of FIG. 7, storage medium 800 of FIG. 8, and logic circuit 928 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-*f*. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of 60 GHz-capable devices 102, 104, 106, and 108 of FIG. 1, logic flow 600 of FIG. 6, logic flow 700 of FIG. 7, storage medium 800 of FIG. 8, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-*f*) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
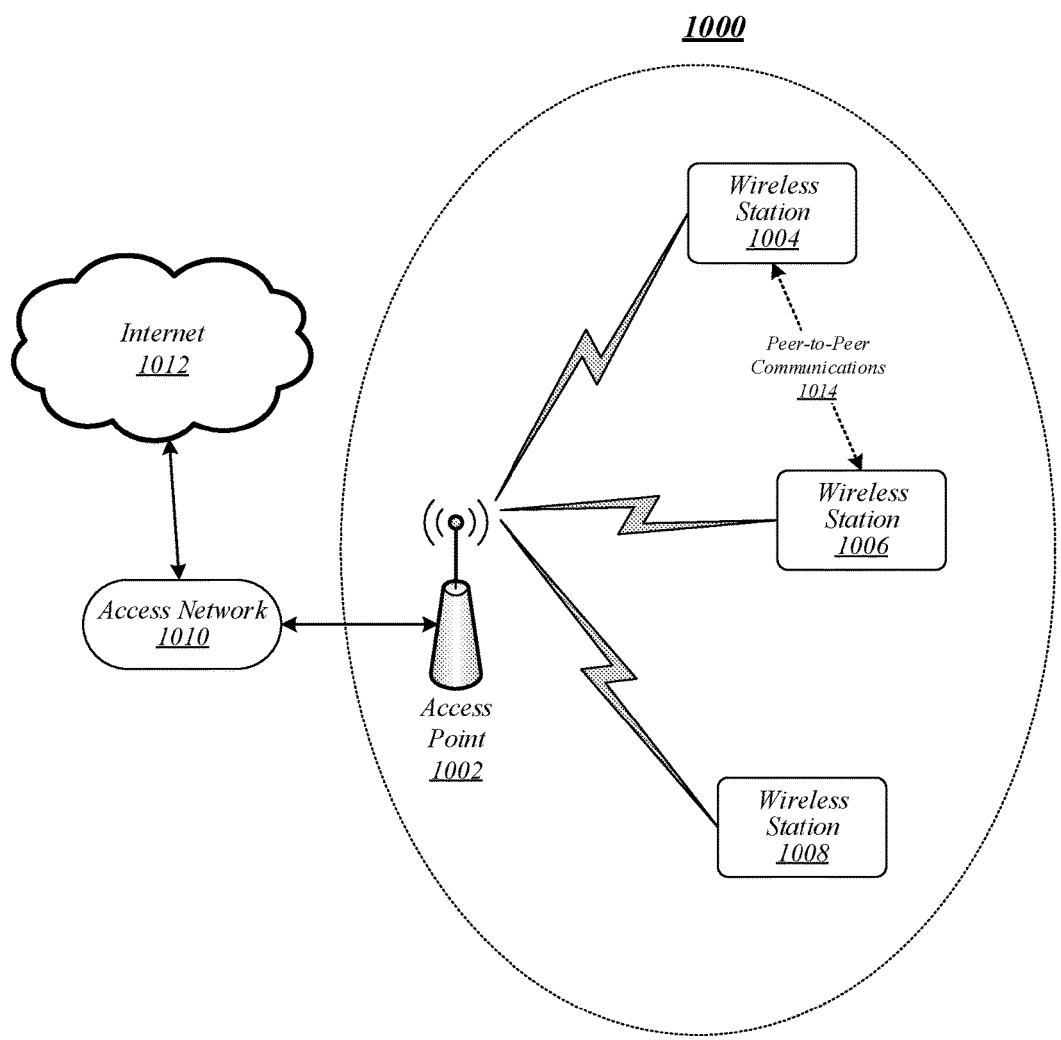
FIG. 10 illustrates an embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In various embodiments, wireless network 1000 may comprise a 60 GHz wireless network, and access point 1002 may communicate with one or more of wireless stations 1004, 1006, and 1008 via one or more 60 GHz band frequency channels. In some embodiments, access point 1002 may be representative of a PCP/AP that transmits management frames containing DL MU-MIMO group management IEs that comprise structures corresponding to IE 300 of FIG. 3. In various embodiments, access point 1002 may be representative of a PCP/AP that transmits PPDUs containing PHY headers that comprise a structure corresponding to header structure 400 of FIG. 4 or header structure 500 of FIG. 5. In various embodiments, one or more of wireless stations 1004, 1006, and 1008 may be representative of a 60 GHz-capable STA that determines a DL MU-MIMO group to which it belongs based on a DL MU-MIMO group management IE that comprises a structure corresponding to IE 300 of FIG. 3. In some embodiments, one or more of wireless stations 1004, 1006, and 1008 may be representative of a 60 GHz-capable STA that receives MPDUs via PPDUs containing PHY headers that comprise a structure corresponding to header structure 400 of FIG. 4 or header structure 500 of FIG. 5. The embodiments are not limited in this context.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising logic, at least a portion of which is in hardware, the logic to determine a group identifier (ID) for a downlink multi-user multiple-input multiple output (DL MU-MIMO) group comprising a station (STA) based on DL MU-MIMO group management information comprised in a received management frame, determine whether a physical layer convergence procedure (PLCP) protocol data unit (PPDU) is addressed to the DL MU-MIMO group comprising the STA based whether a physical layer (PHY) header of the PPDU comprises the group ID for the DL MU-MIMO group comprising the STA, and in response to a determination that the PPDU is addressed to the DL MU-MIMO group comprising the STA, identify one or more spatial streams assigned to the STA based on the PHY header.

Example 2 is the wireless communication apparatus of Example 1, the logic to locate an association identifier (AID) for the STA among an ordered set of AIDs comprised in the DL MU-MIMO group management information, the DL MU-MIMO group management information to indicate a correspondence between the ordered set of AIDs and a DL MU-MIMO group ID, the logic to identify the DL MU-MIMO group ID as the group ID for the DL MU-MIMO group comprising the STA.

Example 3 is the wireless communication apparatus of Example 2, the logic to locate the AID for the STA among one of a plurality of ordered sets of AIDs comprised in the DL MU-MIMO group management information, the DL MU-MIMO group management information to indicate a corresponding DL MU-MIMO group ID for each of the plurality of ordered sets of AIDs.

Example 4 is the wireless communication apparatus of Example 2, the logic to identify a PHY header subfield corresponding to the STA based on a relative position of the AID for the STA among the ordered set of AIDs and identify the one or more spatial streams assigned to the STA based on spatial stream information comprised in the identified PHY header subfield.

Example 5 is the wireless communication apparatus of Example 4, the identified PHY header subfield to comprise a value indicating a number of spatial streams assigned to the STA.

Example 6 is the wireless communication apparatus of Example 5, the logic to identify the one or more spatial streams assigned to the STA based on the number of spatial streams assigned to the STA and on a defined reference order for spatial stream assignment.

Example 7 is the wireless communication apparatus of Example 4, the identified PHY header subfield to comprise a spatial stream bitmap for the STA.

Example 8 is the wireless communication apparatus of Example 1, the logic to receive one or more medium access control (MAC) protocol data units (MPDUs) via the one or more spatial streams.

Example 9 is the wireless communication apparatus of Example 1, comprising a radio interface to receive the management frame over one or more wireless channels of a 60 GHz wireless local area network (WLAN).

Example 10 is a system, comprising a wireless communication apparatus according to any of Examples 1 to 9, at least one radio frequency (RF) transceiver, and at least one RF antenna.

Example 11 is the system of Example 10, comprising a touchscreen display.

Example 12 is a wireless communication apparatus, comprising logic, at least a portion of which is in hardware, the logic to define a downlink multi-user multiple-input multiple output (DL MU-MIMO) group comprising a plurality of stations (STAs), send a management frame identifying a group identifier (ID) for the DL MU-MIMO group and a respective association identifier (AID) for each of the plurality of STAs, and address a physical layer convergence procedure (PLCP) protocol data unit (PPDU) to the plurality of STAs by including the group ID in a physical layer (PHY) header of the PPDU, and a radio interface to transmit the PPDU via a plurality of spatial streams, the PHY header to identify a respective assignment of one or more of the plurality of spatial streams to each of the plurality of STAs.

Example 13 is the wireless communication apparatus of Example 12, the PHY header to comprise a plurality of spatial stream information subfields, each spatial stream information subfield to correspond to a respective one of the plurality of STAs.

Example 14 is the wireless communication apparatus of Example 13, the plurality of spatial stream information subfields positioned according to an order in which the AIDs for their respective corresponding STAs appear in the management frame.

Example 15 is the wireless communication apparatus of Example 13, each spatial stream information subfield to indicate a number of spatial streams assigned to its corresponding STA.

Example 16 is the wireless communication apparatus of Example 13, each spatial stream information subfield to comprise a spatial stream bitmap for its corresponding STA.

Example 17 is the wireless communication apparatus of Example 12, the PPDU to encapsulate a plurality of medium access control (MAC) protocol data units (MPDUs), the plurality of MPDUs to include, for each of the plurality of STAs, at least one MPDU comprising data for that STA.

Example 18 is the wireless communication apparatus of Example 12, the radio interface to transmit the PPDU over one or more wireless channels of a 60 GHz wireless local area network (WLAN).

Example 19 is an access point (AP) comprising a wireless communication apparatus according to any of Examples 12 to 18, the AP to comprise a personal basic service set (PBSS) control point/access point (PCP/AP) for the 60 GHz WLAN.

Example 20 is a system, comprising a wireless communication apparatus according to any of Examples 12 to 18, at least one processor, and at least one memory.

Example 21 is at least one non-transitory computer-readable storage medium, comprising a set of wireless communication instructions that, in response to being executed by circuitry of a station (STA), cause the STA to determine a group identifier (ID) for a downlink multi-user multiple-input multiple output (DL MU-MIMO) group comprising the STA based on DL MU-MIMO group management information comprised in a received management frame, determine whether a physical layer convergence procedure (PLCP) protocol data unit (PPDU) is addressed to the DL MU-MIMO group comprising the STA based whether a physical layer (PHY) header of the PPDU comprises the group ID for the DL MU-MIMO group comprising the STA, and in response to a determination that the PPDU is addressed to the DL MU-MIMO group comprising the STA, identify one or more spatial streams assigned to the STA based on the PHY header.

Example 22 is the at least one non-transitory computer-readable storage medium of Example 21, comprising wireless communication instructions that, in response to being executed by the circuitry of the STA, cause the STA to locate an association identifier (AID) for the STA among an ordered set of AIDs comprised in the DL MU-MIMO group management information, the DL MU-MIMO group management information to indicate a correspondence between the ordered set of AIDs and a DL MU-MIMO group ID, and identify the DL MU-MIMO group ID as the group ID for the DL MU-MIMO group comprising the STA.

Example 23 is the at least one non-transitory computer-readable storage medium of Example 22, comprising wireless communication instructions that, in response to being executed by the circuitry of the STA, cause the STA to locate the AID for the STA among one of a plurality of ordered sets of AIDs comprised in the DL MU-MIMO group management information, the DL MU-MIMO group management information to indicate a corresponding DL MU-MIMO group ID for each of the plurality of ordered sets of AIDs.

Example 24 is the at least one non-transitory computer-readable storage medium of Example 22, comprising wireless communication instructions that, in response to being executed by the circuitry of the STA, cause the STA to identify a PHY header subfield corresponding to the STA based on a relative position of the AID for the STA among the ordered set of AIDs, and identify the one or more spatial streams assigned to the STA based on spatial stream information comprised in the identified PHY header subfield.

Example 25 is the at least one non-transitory computer-readable storage medium of Example 24, the identified PHY header subfield to comprise a value indicating a number of spatial streams assigned to the STA.

Example 26 is the at least one non-transitory computer-readable storage medium of Example 25, comprising wireless communication instructions that, in response to being executed by the circuitry of the STA, cause the STA to identify the one or more spatial streams assigned to the STA based on the number of spatial streams assigned to the STA and on a defined reference order for spatial stream assignment.

Example 27 is the at least one non-transitory computer-readable storage medium of Example 24, the identified PHY header subfield to comprise a spatial stream bitmap for the STA.

Example 28 is the at least one non-transitory computer-readable storage medium of Example 21, comprising wireless communication instructions that, in response to being executed by the circuitry of the STA, cause the STA to receive one or more medium access control (MAC) protocol data units (MPDUs) via the one or more spatial streams.

Example 29 is the at least one non-transitory computer-readable storage medium of Example 21, comprising wireless communication instructions that, in response to being executed by the circuitry of the STA, cause the STA to receive the management frame over one or more wireless channels of a 60 GHz wireless local area network (WLAN).

Example 30 is at least one non-transitory computer-readable storage medium, comprising a set of wireless communication instructions that, in response to being executed by circuitry of an access point (AP), cause the AP to define a downlink multi-user multiple-input multiple output (DL MU-MIMO) group comprising a plurality of stations (STAs), transmit a management frame identifying a group identifier (ID) for the DL MU-MIMO group and a respective association identifier (AID) for each of the plurality of STAs, address a physical layer convergence procedure (PLCP) protocol data unit (PPDU) to the plurality of STAs by including the group ID in a physical layer (PHY) header of the PPDU, and transmit the PPDU via a plurality of spatial streams, the PHY header to identify a respective assignment of one or more of the plurality of spatial streams to each of the plurality of STAs.

Example 31 is the at least one non-transitory computer-readable storage medium of Example 30, the PHY header to comprise a plurality of spatial stream information subfields, each spatial stream information subfield to correspond to a respective one of the plurality of STAs.

Example 32 is the at least one non-transitory computer-readable storage medium of Example 31, the plurality of spatial stream information subfields positioned according to an order in which the AIDs for their respective corresponding STAs appear in the management frame.

Example 33 is the at least one non-transitory computer-readable storage medium of Example 31, each spatial stream information subfield to indicate a number of spatial streams assigned to its corresponding STA.

Example 34 is the at least one non-transitory computer-readable storage medium of Example 31, each spatial stream information subfield to comprise a spatial stream bitmap for its corresponding STA.

Example 35 is the at least one non-transitory computer-readable storage medium of Example 30, the PPDU to encapsulate a plurality of medium access control (MAC) protocol data units (MPDUs), the plurality of MPDUs to include, for each of the plurality of STAs, at least one MPDU comprising data for that STA.

Example 36 is the at least one non-transitory computer-readable storage medium of Example 30, comprising wireless communication instructions that, in response to being executed by the circuitry of the AP, cause the AP to transmit the PPDU over one or more wireless channels of a 60 GHz wireless local area network (WLAN).

Example 37 is the at least one non-transitory computer-readable storage medium of Example 36, the AP to comprise a personal basic service set (PBSS) control point/access point (PCP/AP) for the 60 GHz WLAN.

Example 38 is a wireless communication method, comprising determining, by processing circuitry of a station (STA), a group identifier (ID) for a downlink multi-user multiple-input multiple output (DL MU-MIMO) group comprising the STA, based on DL MU-MIMO group management information comprised in a received management frame, determining whether a physical layer convergence procedure (PLCP) protocol data unit (PPDU) is addressed to the DL MU-MIMO group comprising the STA based whether a physical layer (PHY) header of the PPDU comprises the group ID for the DL MU-MIMO group comprising the STA, and in response to a determination that the PPDU is addressed to the DL MU-MIMO group comprising the STA, identifying one or more spatial streams assigned to the STA based on the PHY header.

Example 39 is the wireless communication method of Example 38, comprising locating an association identifier (AID) for the STA among an ordered set of AIDs comprised in the DL MU-MIMO group management information, the DL MU-MIMO group management information to indicate a correspondence between the ordered set of AIDs and a DL MU-MIMO group ID, and identifying the DL MU-MIMO group ID as the group ID for the DL MU-MIMO group comprising the STA.

Example 40 is the wireless communication method of Example 39, comprising locating the AID for the STA among one of a plurality of ordered sets of AIDs comprised in the DL MU-MIMO group management information, the DL MU-MIMO group management information to indicate a corresponding DL MU-MIMO group ID for each of the plurality of ordered sets of AIDs.

Example 41 is the wireless communication method of Example 39, comprising identifying a PHY header subfield corresponding to the STA based on a relative position of the AID for the STA among the ordered set of AIDs, and identifying the one or more spatial streams assigned to the STA based on spatial stream information comprised in the identified PHY header subfield.

Example 42 is the wireless communication method of Example 41, the identified PHY header subfield to comprise a value indicating a number of spatial streams assigned to the STA.

Example 43 is the wireless communication method of Example 42, comprising identifying the one or more spatial streams assigned to the STA based on the number of spatial streams assigned to the STA and on a defined reference order for spatial stream assignment.

Example 44 is the wireless communication method of Example 41, the identified PHY header subfield to comprise a spatial stream bitmap for the STA.

Example 45 is the wireless communication method of Example 38, comprising receiving one or more medium access control (MAC) protocol data units (MPDUs) via the one or more spatial streams.

Example 46 is the wireless communication method of Example 38, comprising receiving the management frame over one or more wireless channels of a 60 GHz wireless local area network (WLAN).

Example 47 is at least one non-transitory computer-readable storage medium, comprising a set of instructions that, in response to being executed on a computing device, cause the computing device to perform a wireless communication method according to any of Examples 38 to 46.

Example 48 is an apparatus, comprising means for performing a wireless communication method according to any of Examples 38 to 46.

Example 49 is a system, comprising the apparatus of Example 48, at least one radio frequency (RF) transceiver, and at least one RF antenna.

Example 50 is the system of Example 49, comprising a touchscreen display.

Example 51 is a wireless communication method, comprising defining, by processing circuitry at an access point (AP), a downlink multi-user multiple-input multiple output (DL MU-MIMO) group comprising a plurality of stations (STAs), transmitting a management frame identifying a group identifier (ID) for the DL MU-MIMO group and a respective association identifier (AID) for each of the plurality of STAs, addressing a physical layer convergence procedure (PLCP) protocol data unit (PPDU) to the plurality of STAs by including the group ID in a physical layer (PHY) header of the PPDU, and transmitting the PPDU via a plurality of spatial streams, the PHY header to identify a respective assignment of one or more of the plurality of spatial streams to each of the plurality of STAs.

Example 52 is the wireless communication method of Example 51, the PHY header to comprise a plurality of spatial stream information subfields, each spatial stream information subfield to correspond to a respective one of the plurality of STAs.

Example 53 is the wireless communication method of Example 52, the plurality of spatial stream information subfields positioned according to an order in which the AIDs for their respective corresponding STAs appear in the management frame.

Example 54 is the wireless communication method of Example 52, each spatial stream information subfield to indicate a number of spatial streams assigned to its corresponding STA.

Example 55 is the wireless communication method of Example 52, each spatial stream information subfield to comprise a spatial stream bitmap for its corresponding STA.

Example 56 is the wireless communication method of Example 51, the PPDU to encapsulate a plurality of medium access control (MAC) protocol data units (MPDUs), the plurality of MPDUs to include, for each of the plurality of STAs, at least one MPDU comprising data for that STA.

Example 57 is the wireless communication method of Example 51, comprising transmitting the PPDU over one or more wireless channels of a 60 GHz wireless local area network (WLAN).

Example 58 is the wireless communication method of Example 57, the AP to comprise a personal basic service set (PBSS) control point/access point (PCP/AP) for the 60 GHz WLAN.

Example 59 is at least one non-transitory computer-readable storage medium, comprising a set of instructions that, in response to being executed on a computing device, cause the computing device to perform a wireless communication method according to any of Examples 51 to 58.

Example 60 is an apparatus, comprising means for performing a wireless communication method according to any of Examples 51 to 58.

Example 61 is a system, comprising the apparatus of Example 60, and a multiple-input multiple-output (MIMO) antenna array.

Example 62 is the system of Example 61, comprising at least one processor, and at least one memory.

Example 63 is a wireless communication apparatus, comprising means for determining a group identifier (ID) for a downlink multi-user multiple-input multiple output (DL MU-MIMO) group comprising a station (STA), based on DL MU-MIMO group management information comprised in a received management frame, means for determining whether a physical layer convergence procedure (PLCP) protocol data unit (PPDU) is addressed to the DL MU-MIMO group comprising the STA based whether a physical layer (PHY) header of the PPDU comprises the group ID for the DL MU-MIMO group comprising the STA, and means for identifying one or more spatial streams assigned to the STA based on the PHY header in response to a determination that the PPDU is addressed to the DL MU-MIMO group comprising the STA.

Example 64 is the wireless communication apparatus of Example 38, comprising means for locating an association identifier (AID) for the STA among an ordered set of AIDs comprised in the DL MU-MIMO group management information, the DL MU-MIMO group management information to indicate a correspondence between the ordered set of AIDs and a DL MU-MIMO group ID, and means for identifying the DL MU-MIMO group ID as the group ID for the DL MU-MIMO group comprising the STA.

Example 65 is the wireless communication apparatus of Example 64, comprising means for locating the AID for the STA among one of a plurality of ordered sets of AIDs comprised in the DL MU-MIMO group management information, the DL MU-MIMO group management information to indicate a corresponding DL MU-MIMO group ID for each of the plurality of ordered sets of AIDs.

Example 66 is the wireless communication apparatus of Example 64, comprising means for identifying a PHY header subfield corresponding to the STA based on a relative position of the AID for the STA among the ordered set of AIDs, and means for identifying the one or more spatial streams assigned to the STA based on spatial stream information comprised in the identified PHY header subfield.

Example 67 is the wireless communication apparatus of Example 66, the identified PHY header subfield to comprise a value indicating a number of spatial streams assigned to the STA.

Example 68 is the wireless communication apparatus of Example 67, comprising means for identifying the one or more spatial streams assigned to the STA based on the number of spatial streams assigned to the STA and on a defined reference order for spatial stream assignment.

Example 69 is the wireless communication apparatus of Example 66, the identified PHY header subfield to comprise a spatial stream bitmap for the STA.

Example 70 is the wireless communication apparatus of Example 63, comprising means for receiving one or more medium access control (MAC) protocol data units (MPDUs) via the one or more spatial streams.

Example 71 is the wireless communication apparatus of Example 63, comprising means for receiving the management frame over one or more wireless channels of a 60 GHz wireless local area network (WLAN).

Example 72 is a system, comprising a wireless communication apparatus according to any of Examples 63 to 71, at least one radio frequency (RF) transceiver, and at least one RF antenna.

Example 73 is the system of Example 72, comprising a touchscreen display.

Example 74 is a wireless communication apparatus, comprising means for defining, at an access point (AP), a downlink multi-user multiple-input multiple output (DL MU-MIMO) group comprising a plurality of stations (STAs), means for transmitting a management frame identifying a group identifier (ID) for the DL MU-MIMO group and a respective association identifier (AID) for each of the plurality of STAs, means for addressing a physical layer convergence procedure (PLCP) protocol data unit (PPDU) to the plurality of STAs by including the group ID in a physical layer (PHY) header of the PPDU, and means for transmitting the PPDU via a plurality of spatial streams, the PHY header to identify a respective assignment of one or more of the plurality of spatial streams to each of the plurality of STAs.

Example 75 is the wireless communication apparatus of Example 74, the PHY header to comprise a plurality of spatial stream information subfields, each spatial stream information subfield to correspond to a respective one of the plurality of STAs.

Example 76 is the wireless communication apparatus of Example 75, the plurality of spatial stream information subfields positioned according to an order in which the AIDs for their respective corresponding STAs appear in the management frame.

Example 77 is the wireless communication apparatus of Example 75, each spatial stream information subfield to indicate a number of spatial streams assigned to its corresponding STA.

Example 78 is the wireless communication apparatus of Example 75, each spatial stream information subfield to comprise a spatial stream bitmap for its corresponding STA.

Example 79 is the wireless communication apparatus of Example 74, the PPDU to encapsulate a plurality of medium access control (MAC) protocol data units (MPDUs), the plurality of MPDUs to include, for each of the plurality of STAs, at least one MPDU comprising data for that STA.

Example 80 is the wireless communication apparatus of Example 74, comprising means for transmitting the PPDU over one or more wireless channels of a 60 GHz wireless local area network (WLAN).

Example 81 is the wireless communication apparatus of Example 80, the AP to comprise a personal basic service set (PBSS) control point/access point (PCP/AP) for the 60 GHz WLAN.

Example 82 is a system, comprising a wireless communication apparatus according to any of Examples 74 to 81, and a multiple-input multiple-output (MIMO) antenna array.

Example 83 is the system of Example 82, comprising at least one processor, and at least one memory.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating,"

"determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a memory of a station (STA); and
    circuitry of the STA and coupled to the memory, the circuitry to:
        receive a management frame comprising an information element to define groups of multi-user multiple-input multiple output (DL MU-MIMO) capable STAs, the information element comprising a number of groups field to indicate a number of group fields, each group field comprising a group identifier (ID) to identify a DL MU-MIMO group and one or more association identifiers (AIDs) to identify associated one or more STAs;
        identify an association identifier (AID) for the STA among an ordered set of AIDs comprised in one of the group fields, the AID corresponding to a group ID identifying a DL MU-MIMO group; and
        identify the DL MU-MIMO group for the STA based on the group ID, the STA to process PHY layer protocol data units (PPDU) based on the identified DL MU-MIMO.

2. The apparatus of claim 1, the circuitry to process a PHY layer protocol data unit (PPDU) communicated to the DL MU-MIMO group, and determine a number of spatial streams for the STA based on information in the PPDU.

3. The apparatus of claim 1, the circuitry to locate the AID for the STA among one of a plurality of ordered sets of AIDs comprised in the information element, the information element to indicate a corresponding group ID for each of the plurality of ordered sets of AIDs.

4. The apparatus of claim 2, the circuitry to identify a spatial stream field corresponding to the STA in the PPDU, and identify the one or more spatial streams assigned to the STA based on spatial stream information comprised in the spatial stream field.

5. The apparatus of claim 4, the identified spatial stream field to comprise a value indicating a number of spatial streams assigned to the STA.

6. The apparatus of claim 5, the circuitry to identify the one or more spatial streams assigned to the STA based on the number of spatial streams assigned to the STA and on a defined reference order for spatial stream assignment.

7. The apparatus of claim 1, the circuitry to receive one or more medium access control (MAC) protocol data units (MPDUs) via one or more spatial streams.

8. The apparatus of claim 1, comprising a radio interface to receive the management frame over one or more wireless channels of a 60 GHz wireless local area network (WLAN).

9. The apparatus of claim 1, comprising:
    at least one radio frequency (RF) transceiver;
    at least one RF antenna; and
    a touchscreen display.

10. An apparatus, comprising:
    a memory;
    circuitry coupled to the memory, the circuitry to:
        generate a management frame comprising an information element to define groups of multi-user multiple-input multiple output (DL MU-MIMO) capable STAs, the information element comprising a number of groups field to indicate a number of group fields, each group field comprising a group identifier (ID) to identify a DL MU-MIMO group and one or more association identifiers (AIDs) to identify associated one or more STAs based on an ordered set of AIDs, each of the AIDs corresponding to one of the group IDs; and
    a radio interface coupled with the memory and the circuitry, the radio interface configured to transmit the management frame to the one or more STAs to enable communication of PHY layer protocol data units (PPDU) based on identified DL MU-MIMO groups.

11. The apparatus of claim 10, the circuitry to communicate a PPDU to one of the DL MU-MIMO groups, the PPDU comprising spatial stream fields to assign spatial streams to one or more STAs of the DL MU-MIMO group, each spatial stream field to correspond to a respective one of the one or more STAs.

12. The apparatus of claim 11, each spatial stream field to indicate a number of spatial streams assigned to its corresponding STA.

13. The apparatus of claim 11, the PPDU to encapsulate a plurality of medium access control (MAC) protocol data units (MPDUs), the plurality of MPDUs to include, for each of the one or more STAs, at least one MPDU comprising data for that STA.

14. The apparatus of claim 10, the radio interface to transmit the management frame over one or more wireless channels of a 60 GHz wireless local area network (WLAN).

15. An access point (AP) comprising the apparatus of claim 14, the AP to comprise a personal basic service set (PBSS) control point/access point (PCP/AP) for the 60 GHz WLAN.

\* \* \* \* \*